Sept. 3, 1935.  A. HOLLANDER ET AL  2,013,212
ORIFICE FITTING
Filed May 31, 1932   6 Sheets-Sheet 2

Inventors
Aladar Hollander
Herbert E. Grau
Chester A. Lundeen
By
Lyon & Lyon Sept. 3, 1935.   A. HOLLANDER ET AL   2,013,212
ORIFICE FITTING
Filed May 31, 1932     6 Sheets-Sheet 6
Fig. 8.
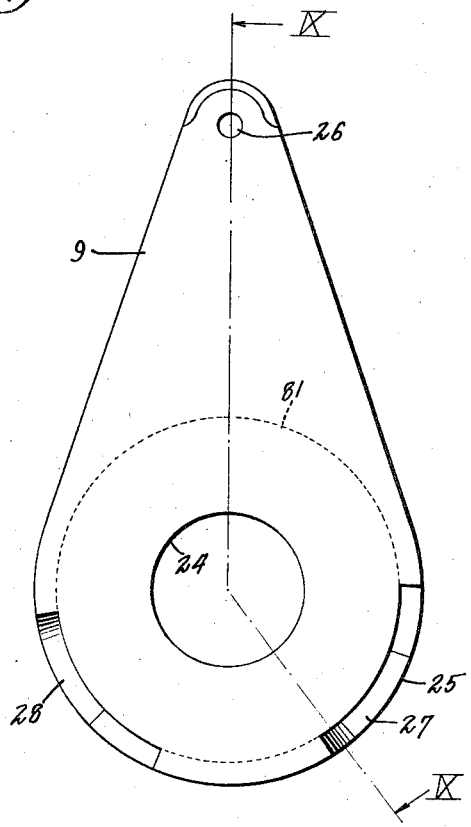
Fig. 9.
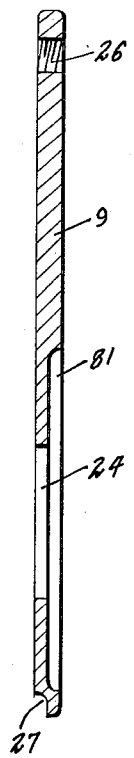
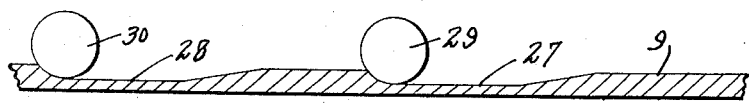
Fig. 10.
Inventors
Aladar Hollander
Herbert E. Grau
Chester A. Lundeen
By
Lyon & Lyon
Attorneys

Patented Sept. 3, 1935

2,013,212

UNITED STATES PATENT OFFICE 2,013,212

ORIFICE FITTING

Aladar Hollander, Berkeley, and Herbert E. Grau and Chester A. Lundeen, Los Angeles, Calif., assignors to Byron Jackson Co., Los Angeles, Calif., a corporation of Delaware Application May 31, 1932, Serial No. 614,436

11 Claims. (Cl. 137—75)

This invention relates to improvements in plate valve fittings, such as are employed to retain the orifice plates or similar plate valves used in the measurement of compressible fluids (gas or steam) and noncompressible fluids, by means of a differential pressure recording gage.

It is an object of the present invention to provide a plate valve or orifice fitting for the purpose of measuring quantities of fluids passing through a conduit, as, for example, the measurement of fluid fuel such as gas, oil, and the like, and it is the practice to employ the measuring device known as a flow or orifice meter in which a restricted passage or orifice is provided in the conduit and a measuring instrument is connected to the conduit to measure or record the differential pressure of the fluid on opposite sides of the restricted orifice.

The measuring or recording instrument employed is usually one which measures the flow of liquid and ordinarily is accurate only over a limited range of pressure difference corresponding to a limited range of variation in flow through the orifice.

In certain types of installations, the flow of fluid varies between wide limits under various operating conditions, for example, in an industrial plant employing a gaseous fuel the daytime operation of the plant will require a large amount of fuel, whereas the night operation of the plant will probably consume a small quantity of fuel. Hence the adaptation of the restricted orifice to the particular meter which is employed may be accurately adjusted for substantially the maximum consumption with great accuracy but when the consumption is reduced, the relation between the orifice and the recording or measuring instrument is not correct to give an accurate reading upon the meter with reduced consumption. Hence it is necessary to alter the relation between the orifice and the instrument to adapt the same for the reduced consumption condition.

It is common practice in the art at the present time to employ means for altering the size of the orifice associated with the meter for varying maximum consumption demands. However, such devices require considerable mechanical operations to be performed upon the orifice device, in order to change the orifice plates or other devices which are employed to vary the size of the orifice opening. Hence the changing of orifice plates constitutes a time consuming operation and in the case where the plates are to be changed with considerable frequency as, for example, each morning and evening, or, in some instances, several times during a day, the amount of time consumed and the cost of making such change is prohibitive. In practice, the cost of making the change may be so prohibitive that the changing of the plates may be dispensed with entirely, the losses due to the inaccuracy of the meter registration being less than the cost of changing the plates.

It is, therefore, an object of the present invention to provide an orifice fitting to be associated with a flow register or recorder in which the orifice may be changed readily and simply, eliminating any considerable time consuming operation.

Another object of the invention is to provide an orifice fitting which may be interposed in a conduit which may contain a pair of plates, each having orifices therethrough of the desired dimensions to fit varying demands, and in which either of the plates may be interposed in the conduit and interchanged without opening the fitting and without laborious mechanical operation.

Another object of the invention is to provide an orifice fitting of the character set forth in the preceding paragraph, in which each of the plates is provided with its own operating means so that both of the plates may be removed from effective operation with respect to the conduit.

Another object of the invention is to provide an orifice fitting as set forth in the preceding paragraph in which a single seat is provided in the fitting for the reception of either of the plates in effective operation in the conduit, and in which separate operating means is provided for each of the plates whereby one or the other of the plates may be moved into the seat, or both of the plates may be removed therefrom.

Another object of the invention is to provide an orifice fitting of the character described in which a blank plate may be employed, (that is having no orifice therethrough), to permit the orifice fitting to be employed as a gate valve when such blank plate is interposed in the conduit.

Another object of the invention is to provide an orifice fitting of the character set forth in which a simple rotary movement of an operating mechanism will move the associated plate into effective relation in the conduit, and in which the movement of the plates into effective position automatically locks the plate against lateral movement or chattering.

Another object of the invention is to provide a fitting as set forth in the preceding paragraph in which release of the locking means is accomplished by the initial movement of the operating mechanism to withdraw the plate.

Another object of the invention is to provide an orifice fitting in which a conduit passage is provided for interposition in the line of the conduit, and in which a chamber for receiving a pair of orifice plates is provided upon the fitting with a slot communicating between the chamber and the passage of just sufficient dimensions to permit the passage therethrough of one of the plates and in which a cut-off valve is provided for forming a fluid-tight seal between the passage and the chamber to permit the opening of the chamber to the atmosphere without preventing escape of fluids from the conduit.

Another object of the invention is to provide a fitting of the character described in which the employment of the plates relative to the seats constitutes a wiping engagement between the plate and seat to automatically clear the seat and plate from débris obstructing accurate seating of the plate.

Another object of the invention is to provide an orifice fitting including a valve interposed between the conduit passage and a plate-containing chamber in which the valve is provided with a seat against which the valve engages with a wiping motion to prevent débris from obstructing the secure seating of the valve.

Another object of the invention is to provide a fitting in which débris which may be accumulated may be forcibly blown out of the fitting without disassembling the fitting and without removing the fitting from service.

Other objects and advantages will be apparent from a study of the following specifications, read in connection with the accompanying drawings, wherein Figure 1 is a side elevational view of an orifice fitting constructed in accordance with our invention;

Figure 8 is a detail elevational view of an orifice plate which may be employed in the fitting shown in Figures 1 to 4;

Figure 9 is a sectional view, taken along line IX—IX of Figure 8; and

Figure 10 is a diagrammatic view illustrating a development of the periphery of the orifice plate shown in Figures 8 and 9.

Figure 1:
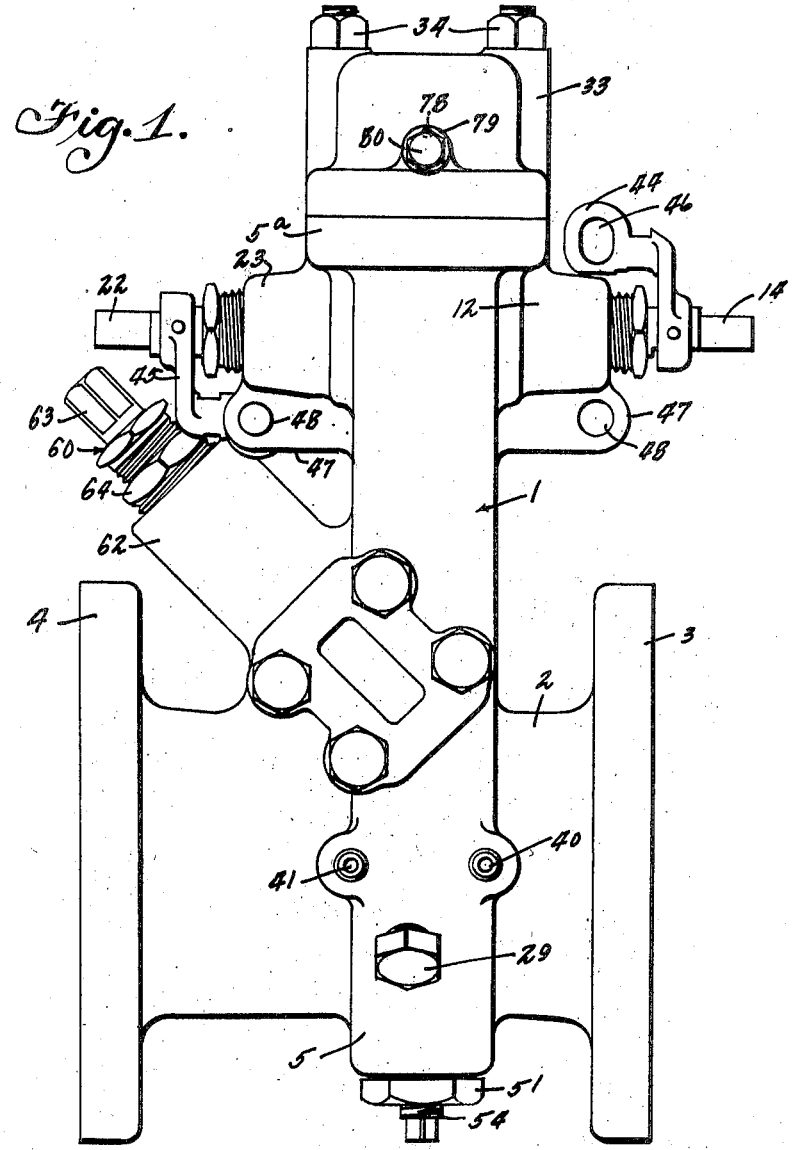

Referring to the drawings, the orifice fitting is illustrated as comprising a body member or casing 1, having a short cylindrical portion 2 conforming in diameter with the diameter of the conduit with which the device is to be associated, and having upon either end thereof a flange 3 and 4, respectively, for attachment thereto of suitable flanges formed upon the adjacent ends of the conduit in which the fitting is to be interposed.

The body member 1 includes a radial enlargement 5 constituting a guide chamber for orifice plates and providing an enlargement of the cylindrical section 2 in which a seat recess 6 for the orifice plates may be formed surrounding the fluid passage 7.

The body member is formed with a lateral extension 5a illustrated as extending upwardly above the cylindrical section 2, and constitutes a substantially rectangular housing above the cylindrical section in which may be housed the orifice plates 8 and 9.

Figure 3:
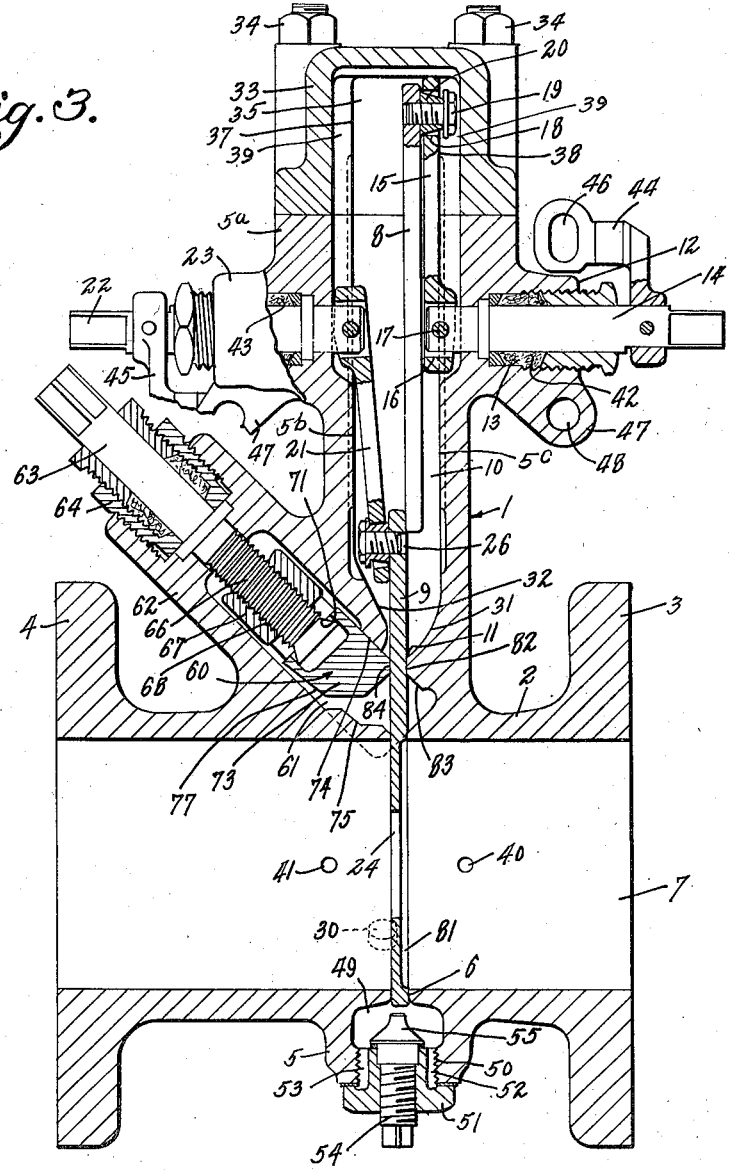
Figure 3 is a vertical sectional view, taken along line III—III of Figure 2, illustrating one of the plates in position in the fluid passage.

Referring particularly to Figure 3, it will be observed that the plates are housed in a plate valve chamber 10 formed in the extension 5a, the side walls 5b and 5c of which lie in planes parallel to each other and transverse to the axis of the fluid passageway 7. The lower end of the chamber 10 is illustrated as being restricted, as at 11, to form a slot-like aperture communicating radially between the chamber 10 and the passage 7 through which the plates 8 or 9 may be projected to interpose the plates in the fluid passage 7.

Formed upon and extending outwardly from the upper portion 5a of the housing 1, is a boss 12 having a bore 13 extending therethrough, the axis of which is substantially parallel to the axis of the fluid passage 7 through the fitting. The bore 13 is illustrated as communicating with the chamber 10 and constitutes a bearing for a crank shaft 14 to which the orifice plate 8 is secured and by which the plate is operated over the housing 10 into the passageway 7.

The plate 8 is illustrated as being connected to the shaft 14 as by means of a crank 15, one end of the crank being formed with an aperture 16 for loosely surrounding one end of the shaft 14, the crank being secured against rotation relative to the shaft as by means of a pin 17 extending through the material of the crank and the shaft. This construction permits a slight movement of the crank relative to the shaft in the direction of the axis of the shaft 14 but insures that rotation of the shaft will cause corresponding rotation of the crank 15.

The opposite end of the crank 15 is provided with an aperture 18 through which extends a bolt 19 threaded into the plate 8, the bolt being preferably surrounded by a tapered washer 20 which forms a loose fit with the aperture 18 also permitting relative movement of the plate and the crank in the direction of the axis of the shaft 14 and also permitting relative rotation between the crank 15 and the plate 8.

The orifice plate 9 is similarly illustrated as being connected through a crank 21 to a shaft 22 which extends through a boss 23 formed upon the side of the housing 5 opposite to the mounting of the shaft 14, the shafts 22 and 14 being preferably in alignment with each other.

Figure 2:
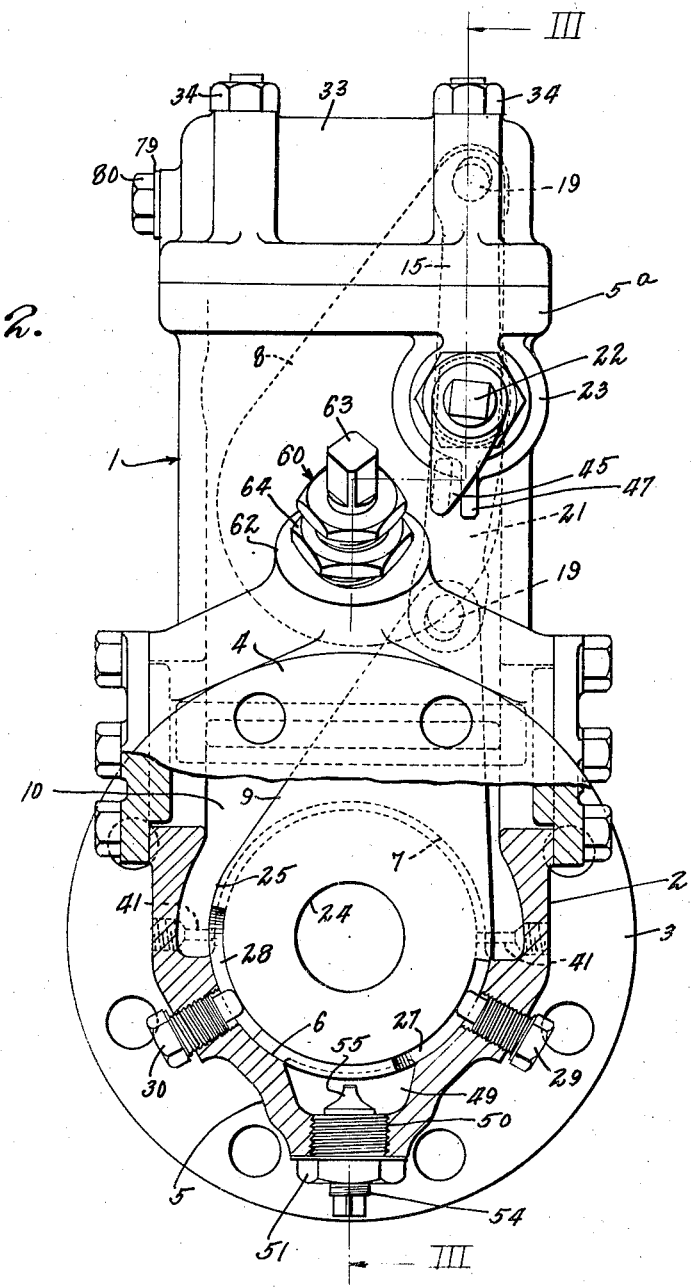
Figure 2 is a front elevational view of the fitting shown in Figure 1 with a portion of the fitting shown in section to illustrate the relation between the fluid passage through the fitting and the plates.

By referring particularly to Figures 2, 3 and 8, it will be observed that the orifice plates 8 and 9 are formed from a sheet of relatively thin material or plate. The plate 9 is illustrated as having an orifice aperture 24 formed near one end thereof, the periphery of the plate surrounding the lower part of the aperture being circular and preferably concentric with the aperture 24, as is indicated at 25. A threaded opening 26 is provided near the upper end of the plate for receiving the bolt 19.

It will be noted that the center of the opening 26 is spaced from the center of the aperture 24 by a distance considerably in excess of the radius of curvature of the lower periphery of the plate. Hence the interconnection of the crank 21 with the plate 9 and the shaft 22 constitutes a crank mounting for the plate, whereby rotation of the shaft 22 will cause the plate 9 to be reciprocated from a position in the chamber 10, as shown in Figure 4, to the position as shown in Figures 2 and 3, in which the lower periphery of the plate 9 is seated upon the seat 6 in the passageway 7 with the aperture 24 interposed in the path of fluid passing through the passageway 7.

Also, referring to Figure 2, it will be observed that as the plate 9 is moved into the seat 6 further rotation of the shaft 22 will cause the plate 9 to be rotated about the seat 6 through a small angle. This lateral rotation is employed for the purpose of locking the plate in the seat 6, as will be observed from an inspection of Figures 2, 8 and 10.

Formed upon one face of the plate 9, near the lower periphery thereof, is a pair of cam surfaces 27 and 28 adapted to engage, respectively, a pair of locking pins 29 and 30, respectively, the pins 29 and 30 extending through the lower walls of the cylindrical section 2 in such position that the cylindrical surfaces of the pins 29 and 30 project into the seat slot 6.

Figure 4:
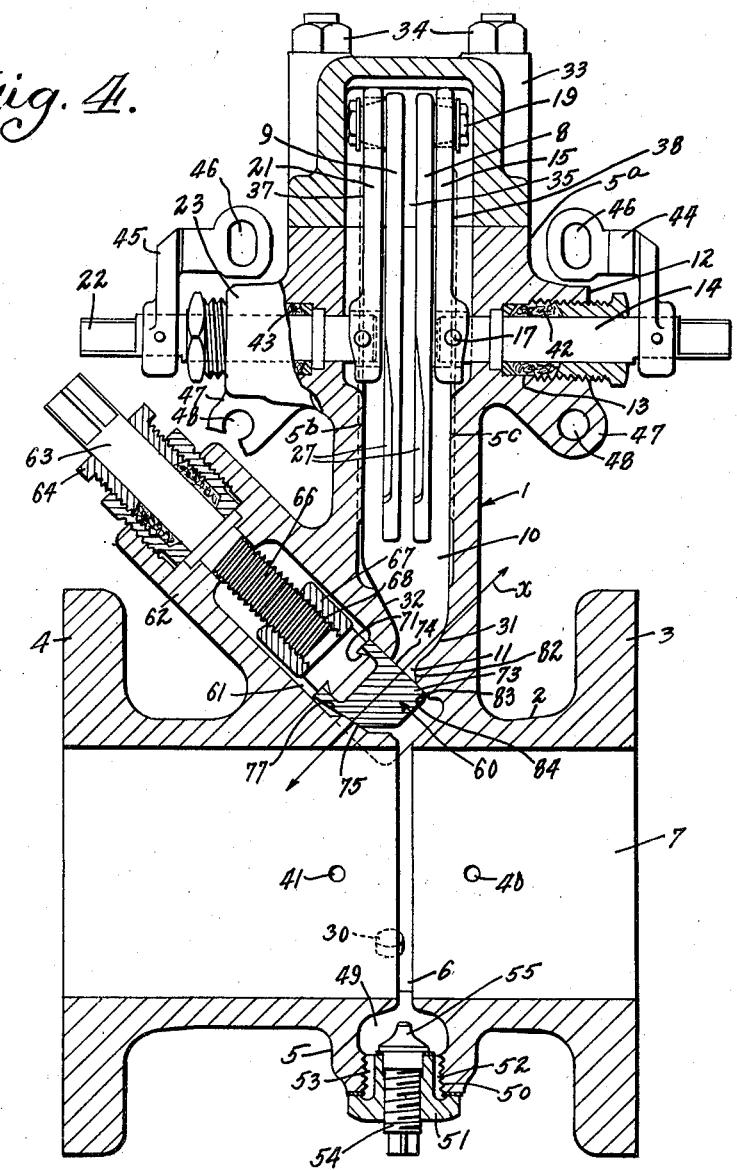
Figure 4 is a sectional view, similar to Figure 3, illustrating both of the orifice plates removed from the fluid passage.

By referring particularly to Figures 3 and 4, it will be observed that the slot 11, through which the plates must pass, is relatively narrow, preferably being just slightly wider than is necessary to permit the thickness of one of the plates to pass therethrough, the lower portions of the walls forming the chamber 10 being angled toward the slot, as is indicated at 31 and 32, to guide the lower end of the plates into alignment with the slots 11. Hence either of the plates must be movable into alignment with the slot 11, and it is for this purpose that the loose connection between the cranks 15 and 21 and their associated plates and shafts is provided, permitting slight lateral displacement of the plates as they are moved downwardly or upwardly.

To assist in the lateral movement of the plates to properly align them with the slot 11, the upper portion of the walls forming the chamber 10 may be formed with cam surfaces guiding the cranks into proper alignment as the cranks are moved relative to the chamber 10.

Figure 6:
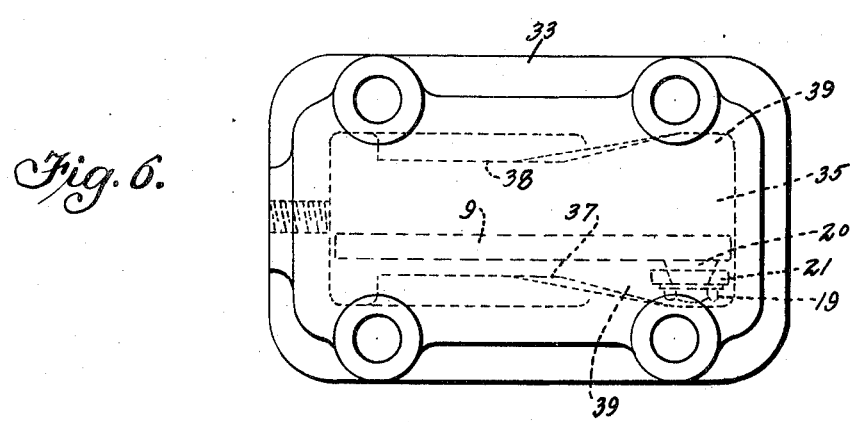
Figure 6 is a top plan view of the cover employed upon the plate chamber of the fitting shown in Figures 1 to 4.
Figure 7:
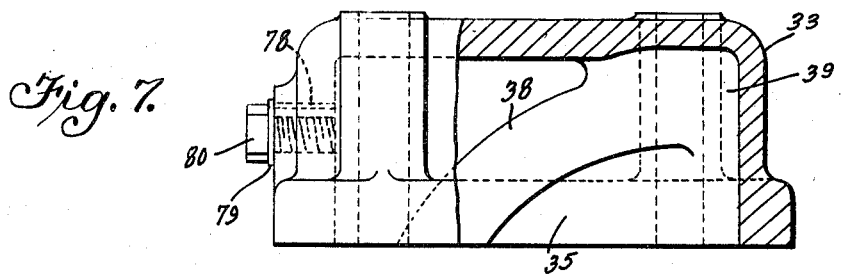
Figure 7 is a front elevational view, partly in section, of the cover shown in Figure 6.

By referring particularly to Figures 3, 6 and 7, it will be observed that the upper portion of the chamber 10 is formed by a suitable removable cap 33 which may be secured to the enlargement 5 of the fitting as by means of suitable studs and nuts 34. The cap or cover 33 is formed with a recess 35 therein constituting a part of the chamber 10, the recess 35 being formed with cam surfaces 37 and 38 on opposite sides thereof so that when one of the plates is elevated into the chamber 10, the bolt 19, associated therewith, will ride against the cam surfaces 37 into the depressed portion 39 thereof, thus permitting the plate to be moved toward the outer wall of the chamber 10. Reverse movement of the plate will cause the bolt 19 to ride upon the cam surface 37 to press the bolt outwardly and thus move the associated plate outwardly into a position of alignment with the slot 11.

It will therefore be observed that by properly selecting the size of the orifice in each of the plates 8 and 9, one of the plates may be selected for heavy demand operation while the other may be selected for light demand operation, and hence the alteration in the relation between the orifice size and the registering of recording instruments, which are connected to the fitting through connection openings 40 and 41, may be accomplished by withdrawing one of the plates and inserting the other.

It will also be observed that the withdrawal and insertion of the plates may be readily accomplished by the mere rotation of the proper shaft 14 or 22 without requiring that the fitting shall be opened to the atmosphere and without requiring any laborious mechanical operations.

Thus with a fitting constructed as set forth, the changing of the orifice plates to accommodate varying demand conditions, involves merely the rotation of the shaft of the plate which is then in operation to withdraw the same and then the rotation of the other shaft to place the opposite plate in operative position.

With the construction thus far described, leakage of fluid during the shifting of the plates is avoided, since it is unnecessary to open the fitting to the atmosphere, and, further, it is unnecessary to close the slot 11 between passageway 7 and the interior of the chamber 10 against leakage of fluid, since fluid which may enter the passageway 7 cannot escape during any portion of the operation of the shaft.

It will be understood that the shafts 14 and 22 will be suitably packed, as is indicated at 42 and 43, to prevent leakage of fluid around them so that even though the full pressure of the fluid passing through the fitting is permitted to enter the chamber 10, leakage therefrom is avoided.

It will also be observed that the shafts 14 and 22 may be provided with locking devices, such as those illustrated at 44 and 45, each of these locking devices constituting a strap of suitable material rigidly secured to the associated shaft, the outer end of the strap being provided with an opening 46 which, when the shaft is rotated to abut the associated plate into operative position in the passageway 7, may bear upon an outstanding lug 47 through which a suitable opening 48 may be formed alignable with the opening 46. Thus a lock of any suitable character may be inserted through the openings 46 and 48 to lock the operative plate against unauthorized removal.

The straps 44 and 45 also constitute indicators, denoting which of the plates is in operative condition and, also, these straps constitute stop limits preventing undue strain upon the shafts, links and plates when moved to operative position, since the abutment of one of the straps of the outstanding lug associated therewith prevents further movement of the shaft.

Since the slot 11, communicating between the chamber 10 and the fluid passageway 7, is only sufficiently large to admit one plate at a time, it follows that locking one of the plates in operative position also locks the other plate from insertion.

By referring particularly to Figure 2, it will be observed that the material forming the cylindrical section 2 of the fitting is cut away at the lowermost portion thereof, as is indicated at 49, to form a sump into which any solid matter in the fluid passing through the fitting may collect, a suitable drain opening 50 communicating with the sump 49 through which this solid material may be drawn off.

The drain opening 50 is provided with a plug 51, the outer periphery thereof being formed with a pair of longitudinal slots 52 and 53 so that loosening of the plug 51 permits communication between the sump 49 and the atmosphere through the space between the head of the plug 51 and the adjacent surface of the fitting. Thus loosening of the plug 51 permits escape of fluid through the passageway formed by the slots so that the pressure of the fluid in the system may be employed to blow out débris which may be collected in the sump 49, effectively cleaning the sump without the necessity of completely removing the plug.

It will be further observed that due to the crank mounting of the orifice plates, the movement of the plates into the seat slot 6 is accomplished with a sliding, wiping motion, and this motion effectively wipes or cleans both the plate and the seat clear of any solid material which might be collected thereon and insures secure seating of the plate upon its seat. Thus the motion of the plate, relative to its seat, tends to wipe any solid material from the seat into the recess or sump 49 so that it may be blown out, as hereinbefore described.

It may occur that one or the other of the plates may become sealed against the seat so that difficulty is encountered in reversing the movement of the plate to withdraw it, and additional force must be exerted upon the plate to break the contact between the plate and the seat. For this purpose, we have illustrated the plug 51 as having a threaded stud 54 extending therethrough with a head 55 formed thereon immediately in alignment with the lower edge of the plate seat 6, so that by rotating the stud 54 the head 55 may be moved up into contact with the plate and exert additional pressure thereon tending to lift the plate from the seat.

In order to adapt the fitting to a number of different installations, or to permit the fitting once installed to be adapted to changes in either the maximum or the minimum demands, it is desirable that one of the plates 8 or 9, or both of them, may be removed from the fitting and other plates inserted in place thereof. Changing or replacing of the plates may be accomplished by removing the cover 33 from the chamber 10 and then removing the desired plate and inserting another plate in place thereof.

However, when this operation is to be performed, some means must be provided for preventing escape of the fluid through the fitting and for this purpose we have provided a cut-off valve 60 which may be interposed between the fluid passage 7 and the plate chamber 10.

Figure 5:
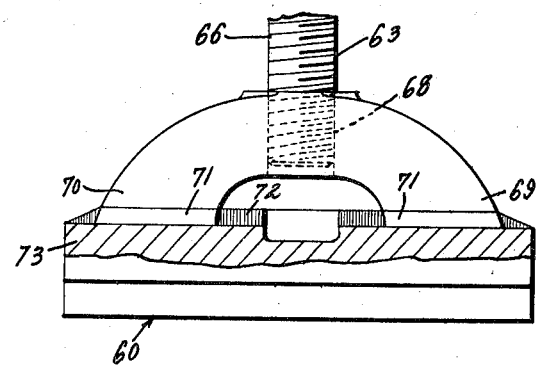
Figure 5 is a detail elevational view, partly in section, of the valve construction shown in Figures 1 to 4.

The valve 60 is arranged to operate in a rectangular recess 61 extending transversely of the fitting and preferably at an acute angle relative to the axis of the fluid passageway 7. The construction is facilitated by forming an outwardly extending boss 62 upon the enlarged section 5 of the fitting through which a shaft 63 extends into communication with the valve recess 61. Preferably the shaft 63 is held in place by means of a suitable packing gland 64 so that the threaded inner end 66 of the shaft may engage a nut or equalizer yoke 67 whereby rotation of the shaft will cause the nut to move upwardly and downwardly upon the thread of the shaft. The yoke is illustrated particularly in Figure 5 as constituting a substantially U-shaped member, the central section of the U being threaded as at 68 to receive the threaded end 66 of the shaft, while the outstanding lugs 69 and 70 have their outer surfaces dovetailed, as is indicated at 71, to operatively engage a dovetailed slot 72 in the valve bar 73. This construction insures equalization of pressure throughout the length of the valve bar when pressure is exerted upon the central section of the U-shaped member.

It will be observed that the valve operated recess 61 intersects the slot 11, which communicates between the fluid passage 7 and the plate chamber 10, so that the upper surface 74 of the valve bar 73 slides across and bridges the slot 11 and engages a seat 83 on the shoulder 82 formed by the angled portion 31 of the wall or the right hand wall of the slot. The lower surface of the recess 61 is preferably formed with an inwardly extending shoulder 75 extending completely across the width of the recess, the lower surface 77 of the valve bar 73 engageable with the shoulder 75 when the valve is moved downwardly toward the fluid passage 7. Thus an effective bridging of the slot 11 is accomplished in which the upper surface of the valve touches the walls 83 surrounding the slot on opposite sides thereof, and is pressed into tight engagement therewith by the engagement of the shoulder 75 with the opposite surface of the valve bar.

It will be observed from an inspection of Figure 4 that when the valve is closed, as is indicated in Figure 4, a plane X drawn through the center of the slot 11 and through the center of the shoulder 75 will intersect the valve bar 73 at right angles to the axis of the valve shaft 63 so that when the valve is closed, as is indicated in Figure 4, the wedging action upon the valve bar between the shoulder 75 and the walls on opposite sides of the slot 11 will exert a force equally distributed upon both of the walls on opposite sides of the slot. Thus, too, effective, tight sealing engagement between the valve and the walls on the opposite sides of the slot is accomplished, preventing leakage of fluid from the passageway 7 to the plate chamber 10.

Thus when it is desired to remove either one or both of the plates 8 or 9 to replace them they may both be moved as hereinbefore described out of the passageway 7 and into the chamber 10. While both plates are removed, there is no obstruction interposed in the slot 11 and the valve shaft 63 may then be operated to close the valve bar 73. Thereafter the valve chamber may be opened to the atmosphere without danger of escape of fluid from the passageway 7. However, during the normal operation of the orifice fitting some of the fluid from the passageway 7 will pass into the valve chamber 10, thereby creating a pressure in the valve chamber substantially equal to that of the fluid passing through the fitting. Thus the removal of the cap or cover 33 would cause a sudden release of this pressure which has accumulated in the chamber 10 and to prevent such occurrence we have provided a bleeder for the chamber 10 which may consist of a small bore or passageway 78 extending through the wall of the cover 33 to communicate with the chamber 10 to the exterior of the cover.

The bore or passageway 78 is normally closed against leakage by means of a washer 79 surrounding a bolt or stud 80 threaded into the wall of the cover, the axis of which is substantially parallel to the axis of the bore or passage 78. Thus when the bolt or stud 80 is tightened, the washer 79 will be pressed into tight engagement over the outer end of the passageway 78 but when the bolt is loosened, the washer 79 will be moved away from the end of the passageway to prevent the bleeding or leakage of pressure from the chamber 10 to the atmosphere until the pressures are equalized and thereafter the cover may be readily removed.

After the plates have been changed as desired, the cover may be again put in place, the valve 73 may be opened, and one or the other of the new plates may be inserted into the fluid passageway 7, as desired.

While the cam action between the pins 29 and 30 and the plate lying in the seat 6 is sufficient to prevent chattering of the plate when in operation, it may be desirable to employ the valve 73 to bear against the plate to more rigidly hold the same in place.

In order to prevent possible distortion of the plate valve 9 by the shut-off valve 60, there is provided a shoulder of metal 82 just above the seat 83 and at that side thereof where the top extension of the plate valve will rest when the plate valve is in the inserted position. This boss 82 is flush with the rear edge of annular seat recess 6. Thus when the shut-off valve 60 is screwed against the plate valve 9 the nose 84 of the valve contacts the plate between the boss 82 and the top of the annular seat recess 6, the distance between these two points being relatively short as compared to the thickness of the plate 9. Consequently the plate 9 will not bend by excessive pressure of the shut-off valve 60, and the seal between the plate valve 9 and the annular seat 6 will not be broken.

While the plates 8 and 9 may be made of any suitable thickness, it is essential that the thickness of the material be sufficient to resist bending of the plates under pressure exerted by the fluid in the conduits in which they may be interposed. If desired, however, the plates may be made of relatively heavy material and a recess 81 may be formed upon one side thereof to reduce the thickness of the plate adjoining the orifice to maintain the correct relations between the diameter of the orifice and the width thereof.

If desired, the fitting may be employed both as an orifice fitting and a gate valve, as, for example, by substituting a blank plate (that is, a plate having no aperture therethrough), for one of the apertured plates, the insertion of this plate into the passageway 7 completely obstructing passage of fluid through the valve, and will act as a complete cut-off or shut-off valve for the line of conduit in which the fitting is interposed.

While we have shown and described the preferred embodiment of our invention, we do not desire to be limited to any of the details of construction shown herein, except as defined in the appended claims.

We claim:

1. In an orifice plate fitting, a body member having a fluid passageway extending longitudinally therethrough, a plate chamber in said body extending in a plane transverse to the axis of said passageway and to one side of said passageway, a slot in said body member communicating between said passageway and said chamber, a pair of plates receivable in said chamber, and independent means for each of said plates for mounting the associated plate in said chamber and for slidably moving the associated plate through said slot between a position in said passageway and a position in said chamber.

2. In an orifice plate fitting, a body member having a fluid passageway extending longitudinally therethrough and having an extension therefrom housing a plate chamber extending laterally from said passageway, a slot extending radially from said passageway into communication with said chamber along a plane transverse to the axis of said passageway, a pair of plates disposed in said chamber, each of said plates having a thickness substantially equal to the width of said slot, independent means for each plate for sliding said plates transversely to the axis of said passageway, and means connecting each plate with its associated moving means to permit movement of said plate longitudinally of said fitting to aline the plate with said slot.

3. In an orifice plate fitting, a body member having a fluid passageway extending longitudinally therethrough and having an extension therefrom housing a plate chamber extending laterally from said passageway, said chamber having side walls lying in a plane transverse to the axis of said passageway, a pair of plates disposed in said chamber parallel with said side walls, each of said plates having an independent crank shaft for each of said plates journaled in and extending through one of said side walls and having connecting means between the plate and its associated crankshaft including a crankarm connected to the associated plate whereby rotation of said crankarm slidably moves the associated plate from a position within said chamber to a position in said passageway, and cam surfaces formed on the side walls of said chamber for engaging said connecting means to move said plates into alinement with said slot.

4. In an orifice plate fitting, a body member having a fluid passageway extending longitudinally therethrough and having a box-like extension therefrom housing a plate chamber, the side walls of said chamber lying in parallel planes transverse to the axis of said passageway, a pair of crankshafts, one extending through each of the side walls of said chamber, a plate for each crankshaft lying in a plane parallel to the side walls of said chamber, a crank arm connecting each plate with its associated crankshaft whereby rotation of one of the crank shafts will slide its associated plate transversely to said passageway from a position in said chamber to a position in said passageway.

5. In an orifice plate fitting, a body member having a fluid passageway extending longitudinally therethrough and having a box-like extension therefrom housing a plate chamber, the side walls of said chamber extending in parallel planes transverse to the axis of said passageway, a slot intercommunicating between said passageway and said chamber along a plane transverse to said passageway and substantially midway between the side walls of said chamber, a pair of plates in said chamber, a pair of crankshafts extending respectively through opposite side walls of said chamber, and a crankarm connecting each of said crankshafts with one of the plates respectively, whereby rotation of one of the crankshafts will slide the associated plate through said slot, said crank arm being pivotally secured to said crankshaft and said plate to permit movement of said plate longitudinally of said fitting to aline itself with said slot.

6. In an orifice plate fitting, a body member having a fluid passageway extending longitudinally therethrough and having a boxlike extension therefrom housing a plate chamber, the side walls of said chamber extending in parallel planes transverse to the axis of said passageway, a slot intercommunicating between said passageway and said chamber along a plane transverse to said passageway and substantially midway between the side walls of said chamber, a pair of plates in said chamber, a pair of crankshafts extending respectively through opposite side walls of said chamber, and a crank arm connecting each of said crankshafts with one of the plates respectively, whereby rotation of one of the crankshafts will slide the associated plate through said slot, said crank arm being pivotally secured to said crankshaft and loosely connected to said plate to permit movement of said plate longitudinally of said fitting to aline itself with said slot.

7. In an orifice plate fitting, a body member having a fluid passageway extending longitudinally therethrough and having an extension therefrom housing a plate chamber extending laterally from said passageway, said chamber having a side wall lying in a plane transverse to the axis of said passageway, a radial recess around said passageway forming a plate seat, the portion of said recess adjacent said plate chamber forming a slot communicating with said chamber, a plate disposed in said chamber parallel with said wall, a crankshaft journaled in and extending through said side wall and offset from a plane passing through the axis of said fluid passageway and the center of said plate, a crank arm interconnecting said crankshaft and said plate, whereby rotation of said crankshaft slidably moves said plate from a position within said chamber to a position upon said seat and rotates said plate upon said seat, and cooperating cam means formed on said plate and said valve body whereby rotation of said plate upon said seat wedges said plate against said seat.

8. In an orifice plate fitting, a body member having a fluid passageway extending longitudinally therethrough and having an extension therefrom housing a plate chamber extending laterally from said passageway, a slot extending along a plane transverse to the axis of said passageway and communicating with said passageway and said chamber, a cut-off valve movable along a plane disposed at an acute angle to the plane of said slot and having a seat intersecting said slot whereby operation of said valve forms a fluid-tight seal between said passageway and said chamber, and a plate in said chamber movable through said slot when said cut-off valve is open from a position in said chamber to a position in said passageway, said cut-off valve having a bearing surface adapted to abut said plate when said plate is in position in said passageway to clamp said plate in said position.

9. In an orifice plate fitting, a body member having a fluid passageway extending longitudinally therethrough and having an extension therefrom housing a plate chamber extending laterally from said passageway, a slot extending along a plane transverse to the axis of said passageway and communicating with said passageway and said chamber, a cut-off valve movable along a plane disposed at an acute angle to the plane of said slot and having a seat intersecting said slot whereby operation of said valve forms a fluid-tight seal between said passageway and said chamber, a plate in said chamber movable through said slot when said cut-off valve is open from a position in said chamber to a position in said passageway, said cut-off valve having a bearing surface adapted to abut said plate when said plate is in position in said passageway to clamp said plate in said position, the wall of said slot opposite the point of contact between the cut-off valve and said plate being formed with alined bearing surfaces above and below the plane of movement of said valve to prevent distortion of said plate under pressure exerted by said cut-off valve.

10. In an orifice plate fitting, a body member having a fluid passageway extending longitudinally therethrough and having an extension therefrom housing a plate chamber extending laterally from said passageway, a slot extending along a plane transverse to the axis of said passageway and communicating with said passageway and said chamber, a cut-off valve movable along a plane disposed at an acute angle to the plane of said slot and having a seat intersecting said slot whereby operation of said valve forms a fluid-tight seal between said passageway and said chamber, a plate in said chamber movable through said slot when said cut-off valve is open from a position in said chamber to a position in said passageway, said cut-off valve including a bar for engagement with said valve seat, said bar having a bearing surface engageable with said plate when said plate is in position in said slot, a rotatable shaft for moving said bar relative to said seat, and an equalizer bar threaded upon said shaft and engaging said seat to equalize the pressure exerted throughout the length of said bar.

11. In an orifice fitting having a plate movable to and from a valve seat and means for wedging the plate against said seat, a sump below said plate adapted to receive débris, a blow-out opening extending from said sump to the exterior of the fitting, a plug removably engaged in said opening, a longitudinal slot in the outer periphery of said plug communicating with said sump, means for closing said slot when the plug is threaded into engagement with the wall of the fitting and screw means extending through said plug and adapted to be projected against said plate to dislodge it from the seat and from the wedging means.

ALADAR HOLLANDER.
HERBERT E. GRAU.
CHESTER A. LUNDEEN.